United States Patent
Hutchison et al.

(10) Patent No.: US 11,500,835 B2
(45) Date of Patent: Nov. 15, 2022

(54) COHORT MANAGEMENT FOR VERSION UPDATES IN DATA DEDUPLICATION

(71) Applicant: International Business Machines Corporation, Armonk, NY (US)

(72) Inventors: Gordon D. Hutchison, Eastleigh (GB); Christopher B. E. Beeken, Hants (GB); Ben Sasson, North Baddesley (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 16/265,722

(22) Filed: Feb. 1, 2019

(65) Prior Publication Data
US 2020/0250158 A1  Aug. 6, 2020

(51) Int. Cl.
| | |
|---|---|
| G06F 16/00 | (2019.01) |
| G06F 7/00 | (2006.01) |
| G06F 16/215 | (2019.01) |
| G06F 16/23 | (2019.01) |
| G06F 16/21 | (2019.01) |

(52) U.S. Cl.
CPC .......... *G06F 16/215* (2019.01); *G06F 16/219* (2019.01); *G06F 16/2365* (2019.01)

(58) Field of Classification Search
CPC .. G06F 16/215; G06F 16/219; G06F 16/2365; G06F 3/0608; G06F 3/0641; G06F 16/1748; G06F 16/172; G06F 16/13; G06F 16/178; G06F 16/148
USPC ........................................................ 707/692
See application file for complete search history.

(56) References Cited

U.S. PATENT DOCUMENTS

| | | | |
|---|---|---|---|
| 8,364,644 B1 * | 1/2013 | Yadav | G06F 16/128 |
| | | | 707/649 |
| 9,449,011 B1 | 9/2016 | Chen et al. | |
| 9,679,040 B1 | 6/2017 | Davis et al. | |
| 9,928,249 B2 | 3/2018 | Lewis et al. | |
| 9,965,182 B2 | 5/2018 | Harnik et al. | |
| 2012/0017060 A1 | 1/2012 | Kapanipathi et al. | |

(Continued)

OTHER PUBLICATIONS

"Data Deduplication", Barracuda Networks, https://www.barracuda.com/glossary/data-deduplication, know about as early as and downloaded on Jul. 21, 2018, pp. 1-5.

(Continued)

*Primary Examiner* — Raquel Perez-Arroyo
(74) *Attorney, Agent, or Firm* — Kunzler Bean & Adamson

(57) ABSTRACT

An apparatus for improved version updates in data deduplication includes a baseline module that stores a baseline referrer link in a first cohort of baseline referrer links pointing to a first location in storage where a baseline version data block is stored. The apparatus includes a signpost module that stores to metadata a signpost that points to an updated referrer link in a second cohort of updated referrer links that points to a second location in the deduplicating storage device where an updated version data block is stored in response to the updated version data block being generated. The apparatus includes a cohort update module that replaces the baseline referrer link with the updated referrer link in response to determining that an additional updated version data block matches the updated version data block pointed to by the signpost. A method and a system implement functions of the apparatus.

20 Claims, 8 Drawing Sheets

(56) References Cited

U.S. PATENT DOCUMENTS

| | | |
|---|---|---|
| 2017/0083563 A1 | 3/2017 | Vijayan et al. |
| 2019/0278504 A1* | 9/2019 | Matsui .................. G06F 3/0608 |
| 2019/0392062 A1* | 12/2019 | Danilov .............. G06F 16/2365 |
| 2020/0057752 A1* | 2/2020 | Tofano .................. G06F 16/215 |

OTHER PUBLICATIONS

Shweta A. Junghare et al., "Overview of Secure Distributed De-Duplication System With Improved Reliability", 2017 International Conference on Inventive Systems and Control (ICISC), Jan. 19-20, 2017, pp. 1-3.

* cited by examiner

COHORT MANAGEMENT FOR VERSION UPDATES IN DATA DEDUPLICATION

BACKGROUND

The subject matter disclosed herein relates to data storage devices and more particularly to improved cohort management for version updates in data deduplication.

Data deduplication is an important feature of modern storage. Virtual machines, application images for virtualization platforms, commonly forwarded email attachments, and personal copies of documents, all contribute to a significant amount of data being stored. These types of objects often include multiple copies of the same data which could be deduplicated but may not be optimally deduplicated by certain systems due to inefficiencies in performance and storage space for searching and finding duplicate blocks.

SUMMARY

An apparatus for improved cohort management for version updates in data deduplication is disclosed that in one embodiment includes a baseline module that stores a baseline referrer link in a first cohort of baseline referrer links pointing to a first location in a deduplicating storage device where a baseline version data block is stored. The apparatus includes a signpost module that stores a signpost to a metadata section of the baseline version data block, where the signpost points to an updated referrer link in a second cohort of updated referrer links that points to a second location in the deduplicating storage device where an updated version data block is stored in response to the updated version data block being generated. The apparatus further includes a cohort update module that replaces the baseline referrer link from the first cohort with the updated referrer link in response to determining that an additional updated version data block matches the updated version data block pointed to by the signpost. A method and a system for improved cohort management for version updates in data deduplication implement functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
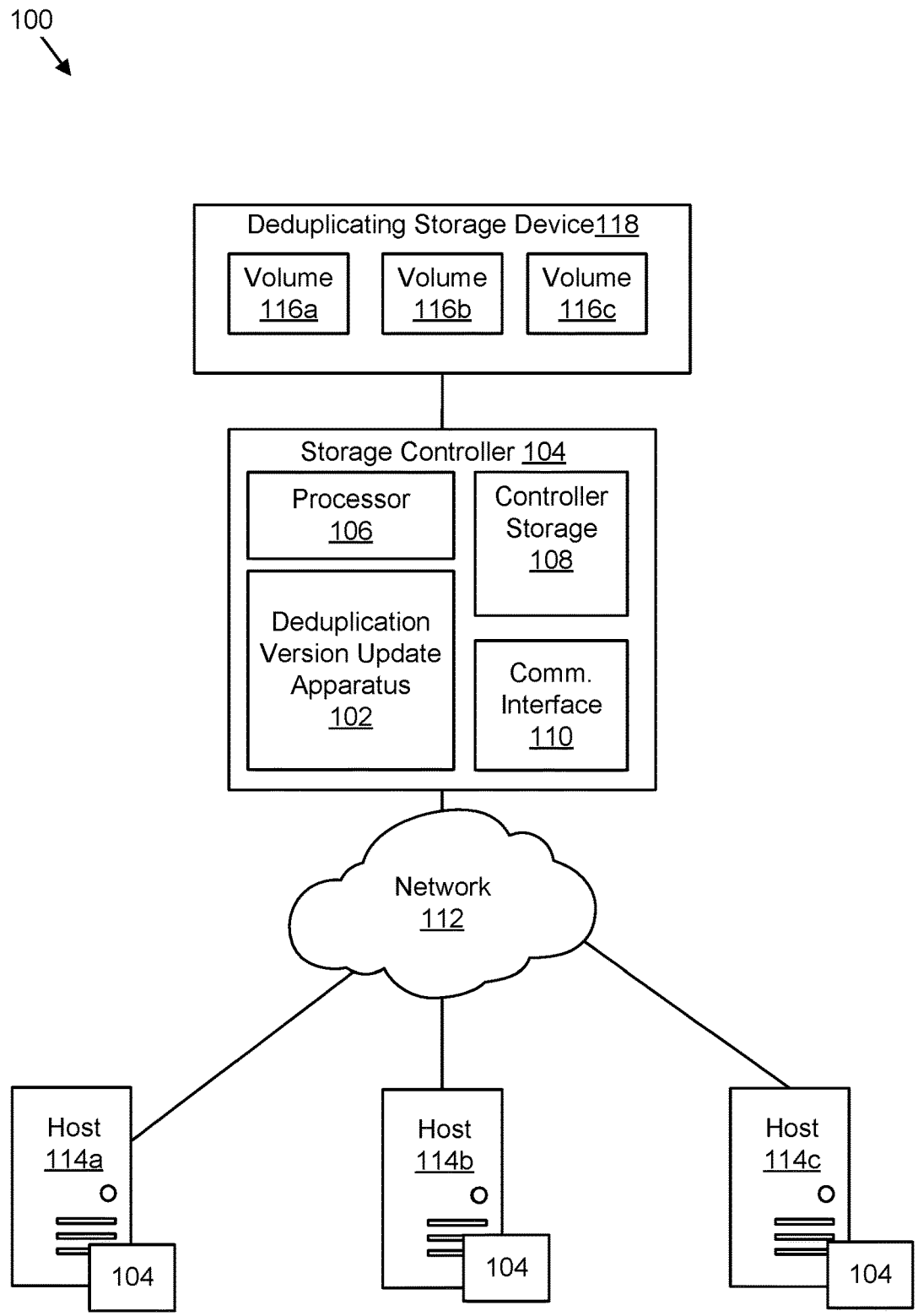
FIG. 1 is a schematic block diagram illustrating one embodiment of a system for improved cohort management for version updates in data deduplication in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

An apparatus includes in one embodiment a baseline module that stores a baseline referrer link in a first cohort of baseline referrer links pointing to a first location in a deduplicating storage device where a baseline version data block is stored. The apparatus includes a signpost module that stores a signpost to a metadata section of the baseline version data block, wherein the signpost points to an updated referrer link in a second cohort of updated referrer links that points to a second location in the deduplicating storage device where an updated version data block is stored in response to the updated version data block being generated and a cohort update module that replaces the baseline referrer link from the first cohort with the updated referrer link in response to determining that an additional updated version data block matches the updated version data block pointed to by the signpost.

In some embodiments, the signpost module further stores to the metadata section, a hash computed on the updated version data block pointed to by the signpost and the cohort update module determines whether the additional updated version data block matches the updated version data block pointed to by the signpost by comparing an additional hash computed on the additional updated version data block with the hash stored with the signpost. In various embodiments, the second cohort of updated referrer links is distributed across a plurality of volumes. In certain embodiments, the cohort update module replaces the baseline referrer link with the updated referrer link during inline deduplication of the additional updated version data block.

In some embodiments, the signpost module increments a count of signpost followers in response to the cohort update module determining that the additional updated version data block matches the updated version data block pointed to by the signpost. In certain embodiments, the signpost module stores one or more signposts and hashes to the metadata section in response to one or more updated version data blocks being generated.

In various embodiments, the signpost module sorts the one or more signposts into s sorted order based on the count of signpost followers that have joined the second cohort corresponding to the updated version data block. In some embodiments, the cohort update module compares a hash of the additional updated version data block with the hashes stored with the one or more signposts in the sorted order.

A method includes, in one embodiment, storing a baseline referrer link in a first cohort of baseline referrer links pointing to a first location in a deduplicating storage device where a baseline version data block is stored. The method further includes storing a signpost to a metadata section of the baseline version data block, wherein the signpost points to an updated referrer link in a second cohort of updated referrer links that points to a second location in the deduplicating storage device where an updated version data block is stored in response to the updated version data block being generated. The method includes replacing the baseline referrer link from the first cohort with the updated referrer link in response to determining that an additional updated version data block matches the updated version data block pointed to by the signpost.

In certain embodiments, the method includes storing to the metadata section, a hash computed on the updated version data block pointed to by the signpost and determining whether the additional updated version data block matches the updated version data block stored at the second location by comparing an additional hash computed on the additional updated version data block with the hash stored with the signpost. In some embodiments, the second cohort of updated referrer links is distributed across a plurality of volumes.

In various embodiments, the method includes replacing the baseline referrer link with the updated referrer link during inline deduplication of the additional updated version data block pointed to by the signpost. In some embodiments, the method includes incrementing a count of signpost followers in response to determining that the additional updated version data block matches the updated version data block pointed to by the signpost.

In certain embodiments, the method includes storing one or more signposts and hashes corresponding to updated version data blocks in response to one or more updated version data blocks being generated. In some embodiments, the method includes sorting the one or more signposts into a sorted order based on the count of signpost followers that have joined the second cohort corresponding to the updated version data blocks. In certain embodiments, the method includes comparing a hash of the additional updated version data block with the hashes stored with the one or more signposts in the sorted order.

A system in one embodiment, includes one or more storage devices with a storage controller configured to store deduplicated data to the one or more storage devices, the storage controller having a processor that is configured to store a baseline referrer link in a first cohort of baseline referrer links pointing to a first location in a deduplicating storage device where a baseline version data block is stored. The processor is configured to store a signpost to a metadata section of the baseline version data block, wherein the signpost points to an updated referrer link in a second cohort of updated referrer links that points to a second location in the deduplicating storage device where an updated version data block is stored in response to the updated version data block being generated and to replace the baseline referrer link from the first cohort with the updated referrer link in response to determining that an additional updated version data block matches the updated version data block pointed to by the signpost.

In certain embodiments, the processor is further configured to perform storing to the metadata section, a hash computed on the updated version data block and determining whether the additional updated version data block matches the updated version data block pointed to by the signpost by comparing an additional hash computed on the additional updated version data block with the hash stored with the signpost.

In some embodiments, the second cohort of updated referrer links is distributed across a plurality of volumes. In various embodiments, the processor is further configured to perform replacing the baseline referrer link with the updated referrer link during inline deduplication of the additional updated version data block.

FIG. 1 is a schematic block diagram illustrating one embodiment of a system 100 for improved cohort management for version updates in data deduplication in accordance with one embodiment of the present invention. The system 100 includes a deduplication version update apparatus 102 in a storage controller 104 with one or more processors 106, controller storage 108, and communications interface 110, data network 112, and one or more hosts 114a, 114b, 114c which are described below.

The system 100 includes a deduplication version update apparatus 102 that stores a first cohort of baseline referrer links pointing to a first location in the one or more storage devices where a data block is stored, stores a signpost to a metadata section of the data block that points to a second location in the one or more storage devices where an updated version of the data block is stored in response to the updated version of the data block being generated, and replaces a baseline referrer link from the first cohort with an updated referrer link in a second cohort of referrer links that points to the second location in response to determining that a new data block corresponding to the data block pointed to by the baseline referrer link matches the updated version of the data block pointed to by the signpost. The deduplication version update apparatus 102 is described in more detail with regard to the apparatuses 200, 400 of FIGS. 2 and 4.

The storage controller 104 includes controller storage 108 which in certain embodiments includes RAM, nonvolatile memory, solid-state drive (SSD), hard disk drive (HDD), and/or any combination other electronic storage for storing program code/instructions, firmware, state information, and the like. The computing device includes one or more processors 106 that are configured to access program code and data from memory within controller storage 108. The storage controller 104 includes a communications interface 110 that in one embodiment, electronically communicates over data network 112. In some embodiments, the communications interface 110 also includes I/O interfaces to accessories, displays, or other I/O devices external to the storage controller 104. In some embodiments, the deduplication version update apparatus 102 and the storage controller 104 are included in a storage enclosure that is part of a storage area network ("SAN"). In other embodiments, the deduplication version update apparatus 102 and the storage controller 104 are included with or connected to an embedded controller or a storage adapter for a server, a personal computer, or similar computing device.

The data network 112, in one embodiment, includes a digital communication network that transmits digital communications. In various embodiments, data network 112 includes a wireless network, such as a wireless cellular network, a local wireless network, such as a Wi-Fi network, a Bluetooth® network, a near-field communication ("NFC") network, an ad hoc network, and/or the like. The data network 112 in some embodiments includes a wide area network ("WAN"), a SAN, a local area network ("LAN"), an optical fiber network, the internet, and/or another digital communication network. In certain embodiments, the data network 112 includes one or more servers, routers, switches, and/or other networking equipment. The data network 112, in some embodiments, also includes one or more computer readable storage media, such as a hard disk drive, an optical drive, non-volatile memory, RAM, or the like.

The deduplicating storage device 118 is designed to reduce storage of duplicate blocks, files, extents and so forth to be stored to the data storage 318. If a host (e.g., 114a) requests to store a data block to the data storage 318, the deduplicating storage device 118 determines whether the data block is a duplicate block to block already stored in the data storage 318. If not, the deduplicating storage device 118 stores the data block to the data storage 318. If another host (e.g., 114b) attempts to store the same block to the data storage 318, the deduplicating storage device 118 instead stores a referrer link to the already stored data block. In various embodiments, multiple referrer links can point to the same stored data block.

Figure 2:
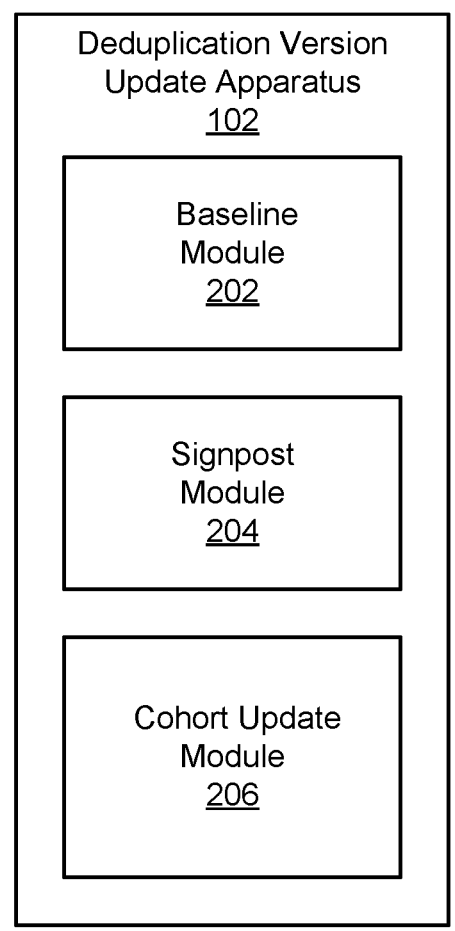
FIG. 2 is a schematic block diagram illustrating one embodiment of an apparatus for improved cohort management for version updates in data deduplication.
Figure 3A:
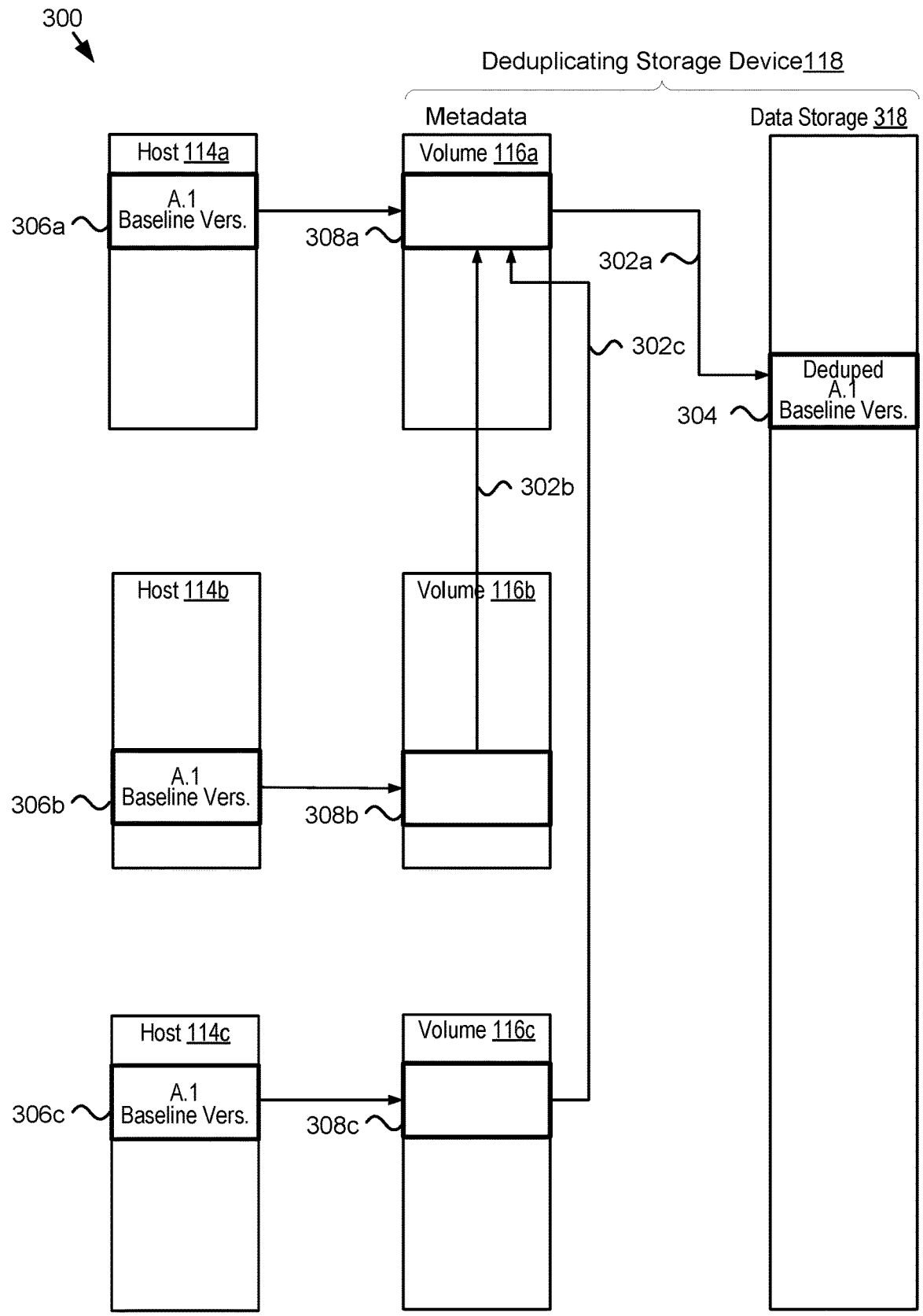
FIGS. 3A, 3B, and 3C are schematic block diagrams illustrating an example of improved cohort management for version updates in data deduplication.
Figure 3B:
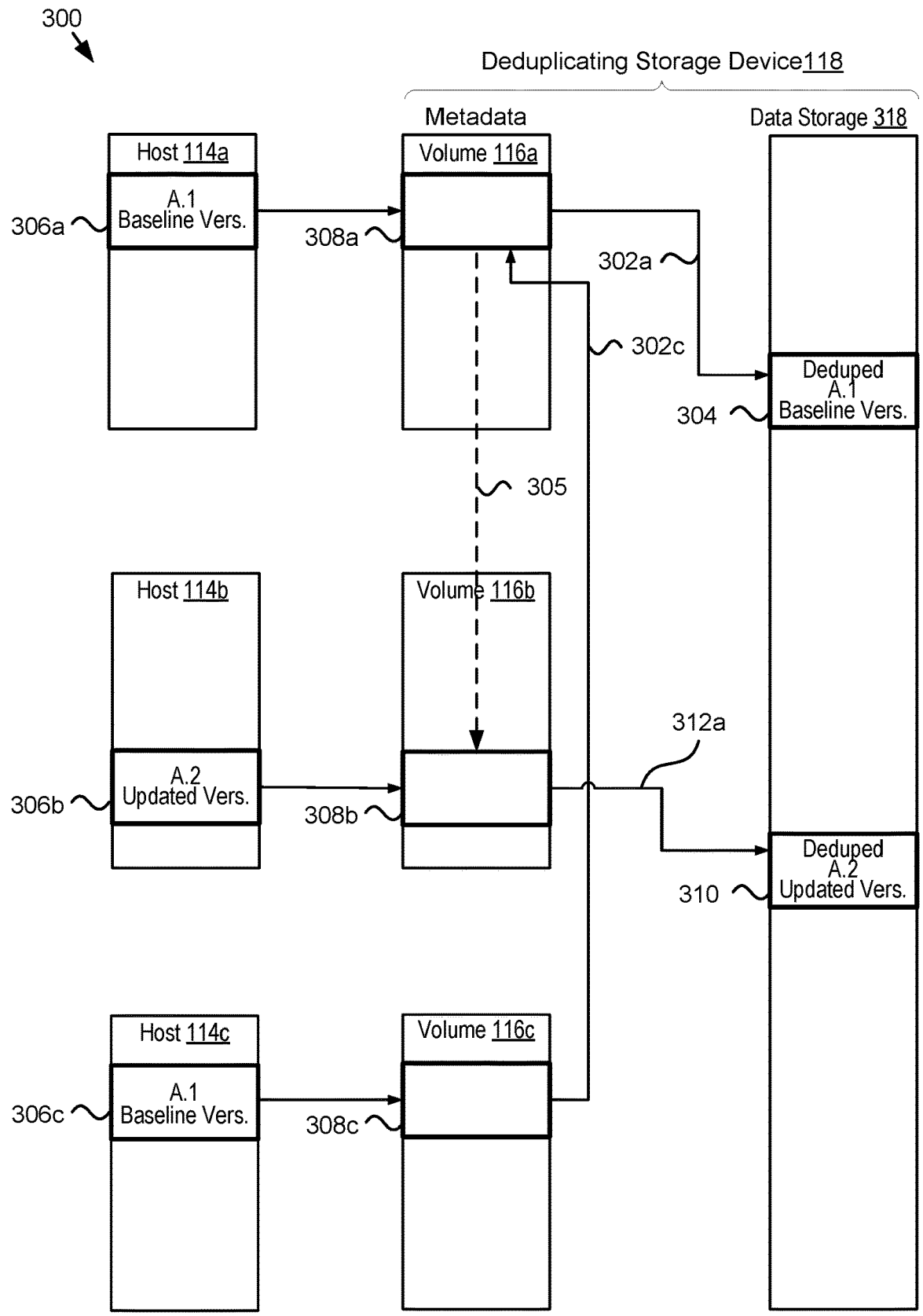
Figure 3C:
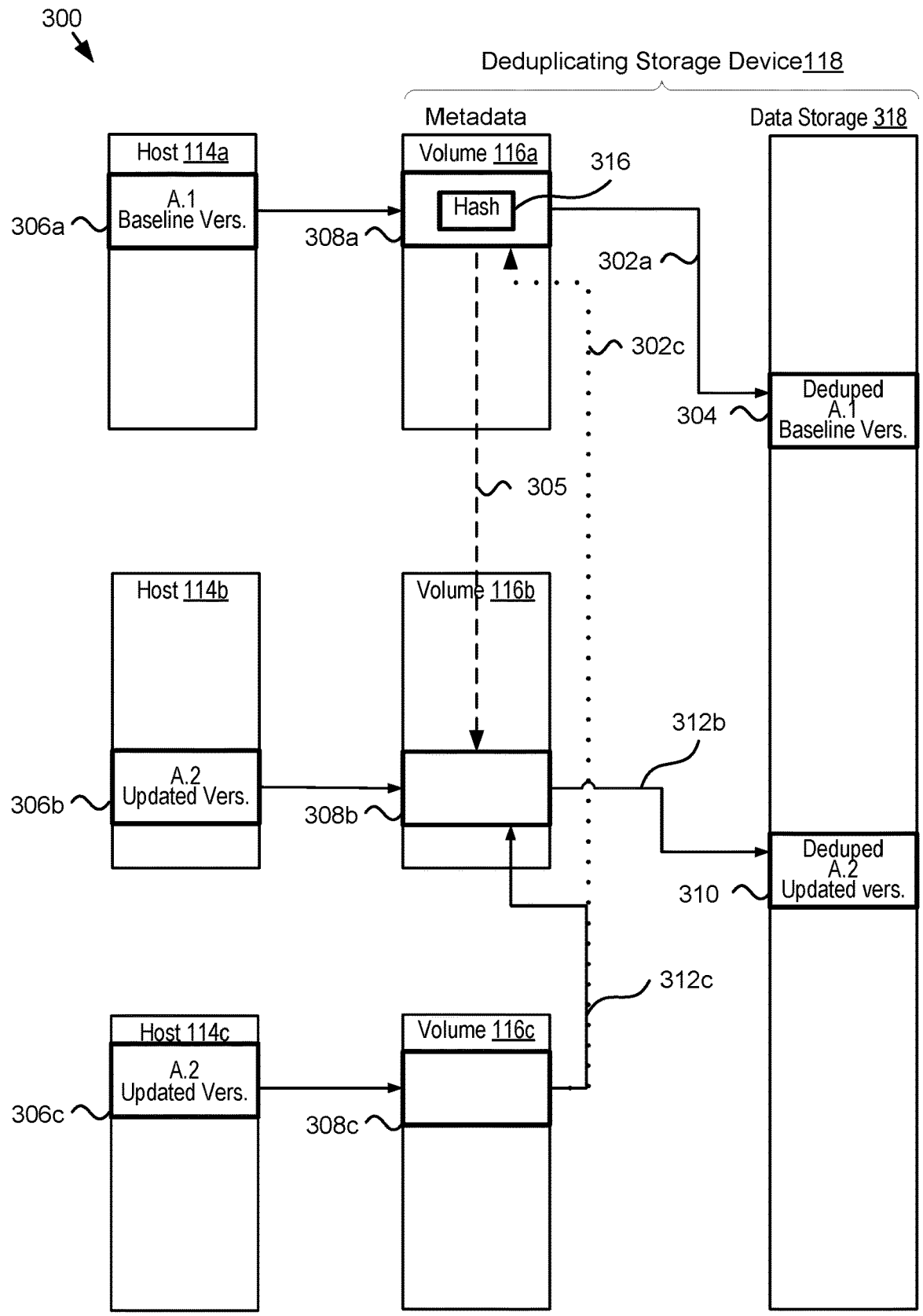

Referring now to FIG. 2 and FIGS. 3A, 3B, and 3C. FIG. 2 is a schematic block diagram illustrating one embodiment of an apparatus 200 for improved cohort management for version updates in data deduplication. FIGS. 3A, 3B, and 3C are schematic block diagrams illustrating an example of a system 300 for improved cohort management for version updates in data deduplication.

The apparatus 200 includes an embodiment of a deduplication version update apparatus 102 with a baseline module 202, a signpost module 204, and a cohort update module 206, which are described below. The system 300 includes one or more hosts e.g. 114a, 114b, 114c with corresponding volumes 116a, 116b, and 116c, a deduplicating storage device 118 that stores data from the volumes 116a, 116b, and 116c. In FIG. 3A, the hosts e.g., 114a, 114b, 114c are depicted as similarly configured hosts that each have a baseline version of a particular data block A.1 (e.g. 306a, 306b, and 306c) which may be a file such as a driver, an image, a library, a document, and so forth, from the hosts' perspective.

In some existing deduplicating storage devices, individual hosts on different virtual machines, or different users accessing different volumes on the same virtual machine, store separate copies of data blocks e.g., virtual machine operating system libraries, software images in container platform images, documents, that could be de-duplicated but are not. This can occur quite frequently when multiple users are using versioned files, data blocks, images, etc., which undergo ongoing updates. Indeed, operating system libraries, software images and container platform images, documents emailed to or shared among multiple users very rarely exist as a single published version that is not updated. These types of data experience incremental changes that tend to percolate across duplicate copies of these documents. In existing systems, when a deduplicated data area is updated to a new version for the Nth time because the Nth host has updated the data block, file, library, etc., this is done no more efficiently than for the first update.

For example, in one embodiment, the system 300 may be in an environment, such as a data center, in which a number of virtual machine hosts (e.g., 114a, 114b, 114c) may each be running a certain operating system, such as for example Windows® 10. In such an embodiment, certain data (e.g., object files, libraries files, date blocks, data extents) may have a baseline point in time in which each host volume has a large amount of duplicate data. Because each host may perform updates to the operating system independently at different times, when the first host performs the update to the operating system, some data that was duplicate data (and thus benefitted from the deduplicating storage device) is no longer duplicate data because it is an updated version of the operating system or of a software component of the operating system.

However, as the second host (e.g., 114b), third host (e.g., 114c), and so forth each apply or install the updated version, it is quite likely that the amount of duplicate data will increase as more hosts apply the updated version and the duplicate data areas again converge. For example, when a number of Windows® 10 VMware® hosts all apply security patch 21323.1232, it is likely those hosts will attempt to write duplicate updated version data blocks. This creates a situation where there are two relevant "sources" of data, the old (e.g. baseline) version and the new (e.g., updated version), and a set of cohort referrer links migrates, one cohort member at a time from the old (baseline) version data to the new (updated) version data.

In various embodiments, the apparatuses 200, 400 with the deduplication version update apparatus 102 improve the performance of the deduplicating storage device 118 for new data writes (e.g. updated version data) where the old (e.g., baseline) data has already been de-duplicated (e.g., by an earlier update to a library of a host operating system) by leveraging the history (which the deduplication version update apparatus 102 stores in the metadata) of the old data's de-duplication referrer cohort siblings in order to sign-post the de-duplication of the 'new' updated data written to other copies of the new data that have already been seen and deduplicated by the system.

For example, in FIG. 3A, the host 114a is depicted as having a baseline version data block 306a. As used herein the term "block" may refer to a fixed length block, a variable length extent, a file, or any logical unit of data which can be deduplicated by storing a single copy of the block to a first location in the data storage 318 and storing one or more baseline referrer links pointing to the first location in the data storage 318.

The term "baseline version," as used herein, refers to any particular version of the block, file, extent, etc., at a particular point in time as compared to an "updated version" which refers to a person which has had some update or change since the baseline version. In FIG. 3A, the updated version data block A.2 is not yet stored to the data storage 318. In FIG. 3B, host 114b is depicted as having replaced the baseline version data block A.1 with updated version data block A.2 which is stored to the data storage 318.

In the example depicted in FIG. 3B, because host 114b is the first host to update to version A.2, the deduplicating storage device 118 stores the updated version data block A.2 to a second location 310, because it is not a duplicate of a data block already stored in the data storage 318. The metadata section 308b of the volume 116b now has an updated referrer link 312a that points to the second location 310 in the data storage 318.

Referring again to FIG. 2, in one embodiment, the apparatus 200 includes a baseline module 202 that stores a first cohort of baseline referrer links e.g., 302a, 302b, 302c pointing to a first location in data storage 318 where a baseline version data block e.g., 304 is stored in the data storage 318. As used herein, the term "cohort" indicates a set of referrer links that referred to the same version of the data block, file, library, etc. In various embodiments, the apparatus 200 further includes a signpost module 204, that stores a signpost 305 (shown as a dashed line in FIG. 3b) to a metadata section 308a of the baseline version data block stored at the first location 304 of the data storage 318.

In one embodiment depicted in FIGS. 3A, and 3B, the host 114a is the first host to write baseline version data block 306a. Accordingly, in the metadata section 308a for the baseline version data block 306a in volume 116a, the referrer link 302a points directly to the deduplicated baseline version data block A.1 stored in the data storage 318 at the first location 304. Thus, the referrer link 302a is the first referrer link of the cohort pointing to deduplicating baseline version A.1 at the first location 304. The hosts 114b, 114c have also attempted to write the same baseline version data block A.1 to the data storage 318 and therefore the baseline referrer links 302b and 302c point to the metadata section 308a which in turn points to the deduplicated baseline data block A.1 at the first location 304 of the data storage 318.

In one embodiment, the deduplication version update apparatus 102 includes a signpost module that stores a signpost (e.g., 306) to a metadata section (e.g., 308a) of the baseline version data block (e.g., 304), where the signpost 305 points to an updated referrer link 312b in a second cohort of referrer links that point to a second location (e.g., 310) where the updated version data block A.2 is stored in response to the updated version data block being written. As used herein, the term "signpost" indicates a hint that may be followed to the location of a possible duplicate data block.

Referring now to FIGS. 2, and 3B, 3C, in one embodiment, as part of the version update operation, the system 300 accesses the metadata (e.g., 308a) of the old e.g., baseline version data block that is still being pointed to by the other baseline referrer links (302a, 302c) in the first cohort. If the number of remaining referrers links makes it worthwhile (i.e., if the time and storage space required to perform a versioning update do not outweigh the benefit of performing a versioning update), the signpost module 204 adds the signpost (e.g. 306) that identifies a location (e.g., 310) in the data storage 318 where the updated version data block of the leaving cohort member's data is stored.

In some embodiments, the deduplication first update apparatus 102 includes a cohort update module 206 that replaces the baseline referrer link 302c (shown in FIG. 3C with a dotted line) from the first cohort with an updated referrer link 312c and a second cohort of referrer links (e.g. 312b, 312c) that points to the second location 310 where the updated version data block is stored in response to determining that an additional updated data block e.g. 306c matches the updated version data block pointed to by the signpost 305, i.e. at the second location 310. In other words, if the signpost module 204 finds a signpost e.g., 305 to the second location 310 where the updated version data block is stored and the additional updated version data block (e.g., 306c) matches the stored updated version data block, the cohort update module 206 adds the updated referrer link 312c to the second cohort and increments the count of signpost followers (e.g. the signpost followers in FIG. 3c are 312b and 312c).

In certain embodiments, the signpost module 204 sorts the signposts by the number of updated version data blocks (e.g., referents) for which the cohort update module 206 has replaced the baseline referrer link with the updated referrer link so that the signposts can be considered optimally i.e., in order from most probable signpost leading to a match, to the next more probable signpost leading to a match, and so forth.

In various embodiments, there is limited room in the deduplication metadata to store signposts. Accordingly, in some embodiments, the signpost module 204 stores the most followed signposts. If the referring links in a baseline cohort fragment into more than a very small number of updated version cohorts, applying versioning to deduplication of the baseline cohort is less likely to provide benefit from the versioning and the signpost module 204 does not store a signpost for such referrer links so as not to incur a storage cost associated with the additional metadata.

In various embodiments, the count of signpost followers allows the system determine whether a particular type of data is likely for have deduplication cohorts that track version updates and thus track the benefit of the deduplication version update apparatus 102 for a particular dataset allowing it to be switched on/off optimally.

In some embodiments, the signposts and/or the referrer links are implemented in the metadata as a list, a table, a linked list, or any data structure that allows the signposts to be followed. In other words, the signpost be stored in any metadata structure that can be accessed to find a location of a stored updated version data block that can be compared with a new data block to be written, i.e., an additional updated data block.

When the cohort update module replaces the baseline referrer link in the first cohort with an updated referrer link in the second cohort the baseline referrer link is said to "leave" the first cohort, follow the signpost, and join the second cohort of referrer links that points to the updated version data block pointed to by the signpost.

Figure 4:
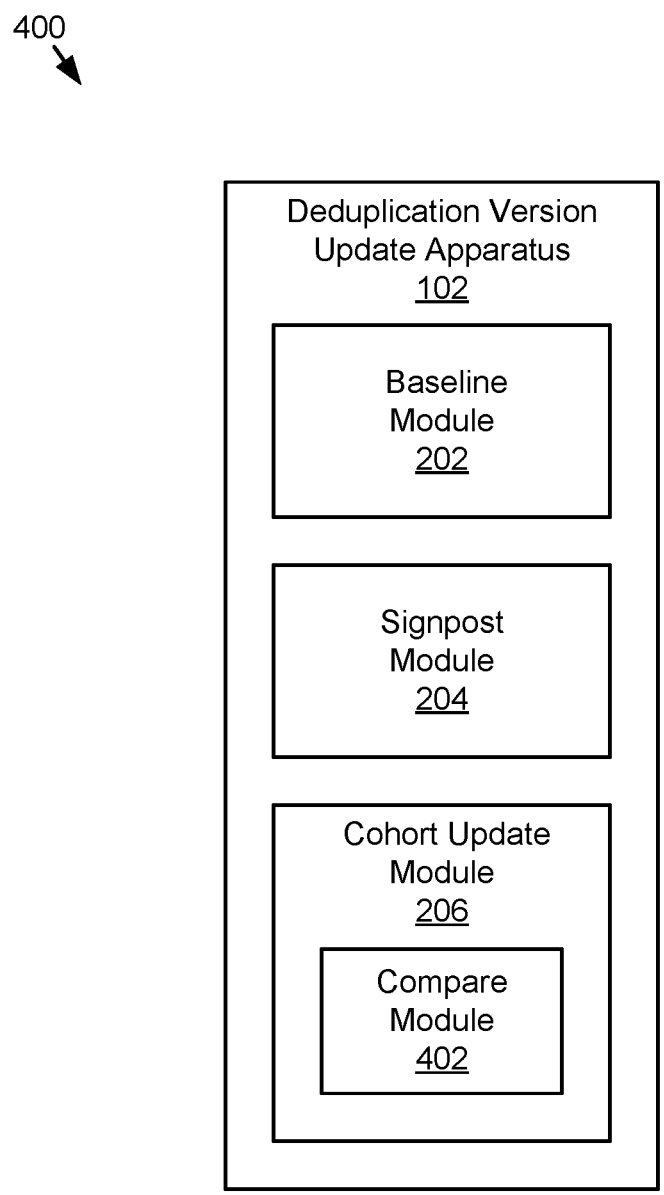
FIG. 4 is a schematic block diagram illustrating another embodiment of an apparatus for improved cohort management for version updates in data deduplication.

FIG. 4 is a schematic block diagram illustrating another embodiment of an apparatus 400 for improved cohort management for version updates in data deduplication. The apparatus 400 includes a baseline module 202, a signpost module 204, and a cohort update module 206, which are substantially similar to those of the apparatus 200 of FIG. 2. The apparatus 400 in various embodiments, also includes a compare module 402, which is described below.

In various embodiments, when a referrer link leaves the baseline cohort, in response to an instruction to store the updated version data block, the signpost module 204 stores a short hash of the updated version data block to the metadata section 308a of the baseline version data block. In certain embodiments, a full hash is a full 20-byte hash (in the case of SHA-1 being used). A short hash is a smaller 6-byte hash based on the 20-byte hash, which is taken from the middle of the 20-byte hash.

When a different baseline referrer link is a potential signpost follower, the compare module 402 calculates a short hash of the updated version data block and compares the calculated short hash with short hashes of a signpost 316 already stored to the de-duplication meta-data. If the compare module 402 finds that the compared short hashes match, then the cohort update module replaces the baseline version referrer link with the updated version referrer link. Comparing the short hashes provides a much more efficient means of finding the de-duplicated record for the new version of the data than searching data blocks stored in the storage device from scratch as is typically done today.

In some embodiments, using the short hash provides nearly the same level of accuracy as the full 20-byte hash, but at a significant lower cost of memory and resources. Basically, the short hash is a space optimization technique and provides a "hint" that the stored updated version data block and the new updated version data block that the host is attempting to write are likely to match. The compare module 402 then calculates compares a full hash of the stored updated version data block and the different e.g., new updated version data block to confirm the likely match.

In certain embodiments, as a host e.g., 306b applies additional updates to an additional updated baseline version data block, the signpost module 204 also stores additional signposts and additional signpost hashes to the metadata of the additional updated version data blocks. The compare module 402 compares a hash of the additional data block to be written with the earlier stored additional hashes to determine whether a duplicate copy of the updated data exists, i.e., if the new additional updated version data block to be written matches any of the additional updated version previously written.

For example, if a host goes though updated versions 1.0, 1.1, 1.2 then an additional data block e.g., within an updated version of a container, dynamic link library, image, and/or document that an additional host determines to write may do the same. Thus, by comparing the additional data block to be written with the signposts and the hash stored with the signpost of other updated data block previously stored, a particular host may go from version 1.0 directly to version 1.2 whereas other hosts may have gone through the version 1.0→1.1→1.2 sequence.

In such embodiments, a forward signpost (i.e., a signpost for an updated version that points to an additional sign post for the next updated version) may be viewed as a branch in a tree of signposts and hashes that can be quickly traversed and checked, to any depth that is considered an optimization when compared with the cost of a standard 'start from scratch' search.

It may be note that the benefit of version sign posting depends on the type of data being deduplicated. For example, there are probably thousands of copies of the operating systems (e.g., Linux®) stored in cloud servers (e.g., Amazon AWS®) and many will have significant duplication for any particular version. Accordingly, the associated data stored will be quite "lumpy" in terms of versioning and will also tend to follow common "tracks" from version to version so the various embodiments of the deduplication update apparatus will provide significant improvements in such an environment. In contrast, if multiple records in an astrophysics data set were deduplicated, it is quite unlikely that they will form a long term cohort type relationship across multiple versions.

Figure 5:
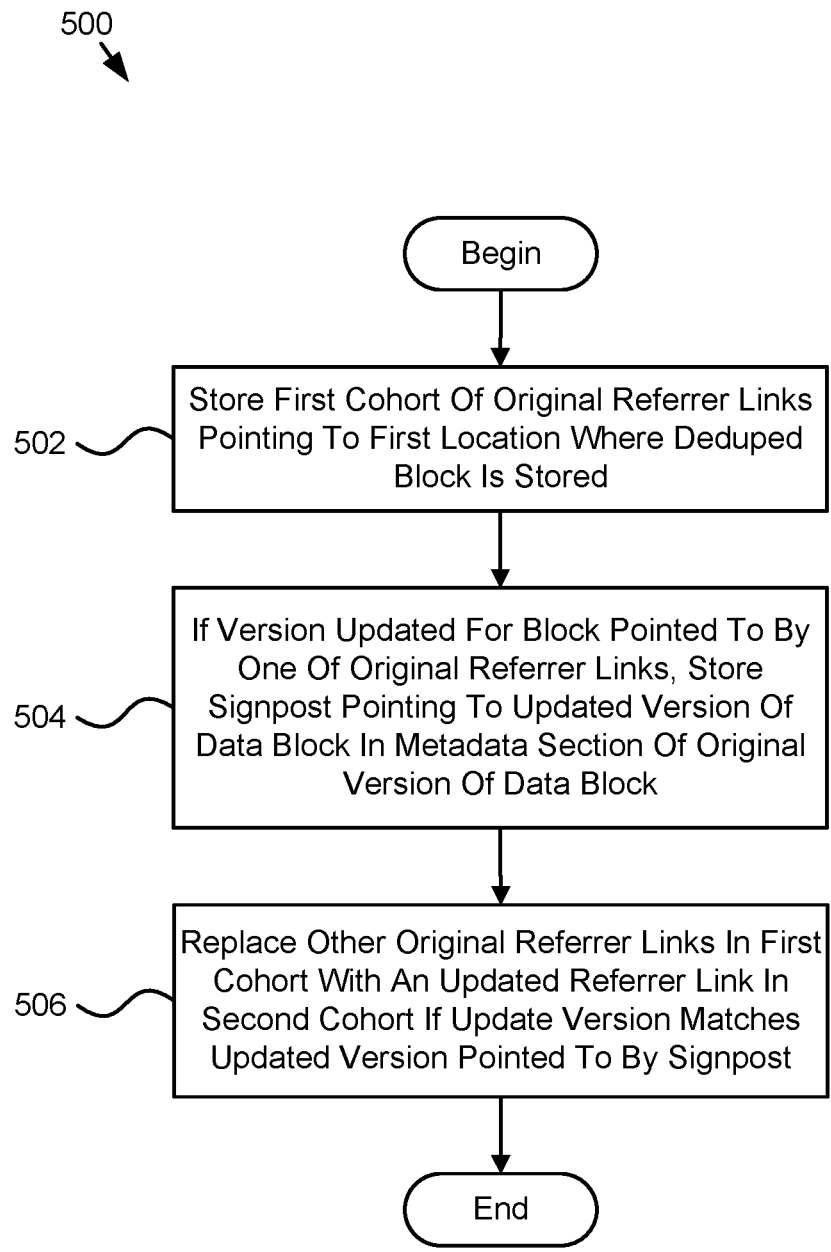
FIG. 5 is a schematic flow chart diagram illustrating one embodiment of a method for improved cohort management for version updates in data deduplication.

FIG. 5 is a schematic flow chart diagram illustrating one embodiment of a method 500 for improved cohort management for version updates in data deduplication. In one embodiment, the method 500 includes storing 502 a baseline referrer link in a first cohort of baseline referrer links pointing to a first location in a deduplicating storage device where a baseline version data block is stored. The method 500 further includes storing 504 a signpost to a metadata section of the baseline version data block, where the signpost points to an updated referrer link in a second cohort of updated referrer links that points to a second location in the deduplicating storage device where an updated version data block is stored in response to the updated version data block being generated. The method 500 also includes replacing 506 the baseline referrer link from the first cohort with the updated referrer link in response to determining that an additional updated version data block matches the updated version data block pointed to by the signpost. All or portions of the steps of the method 500 may be implemented using the baseline module 202, the signpost module 204, the cohort update module 206, and/or the compare module 402.

Figure 6:
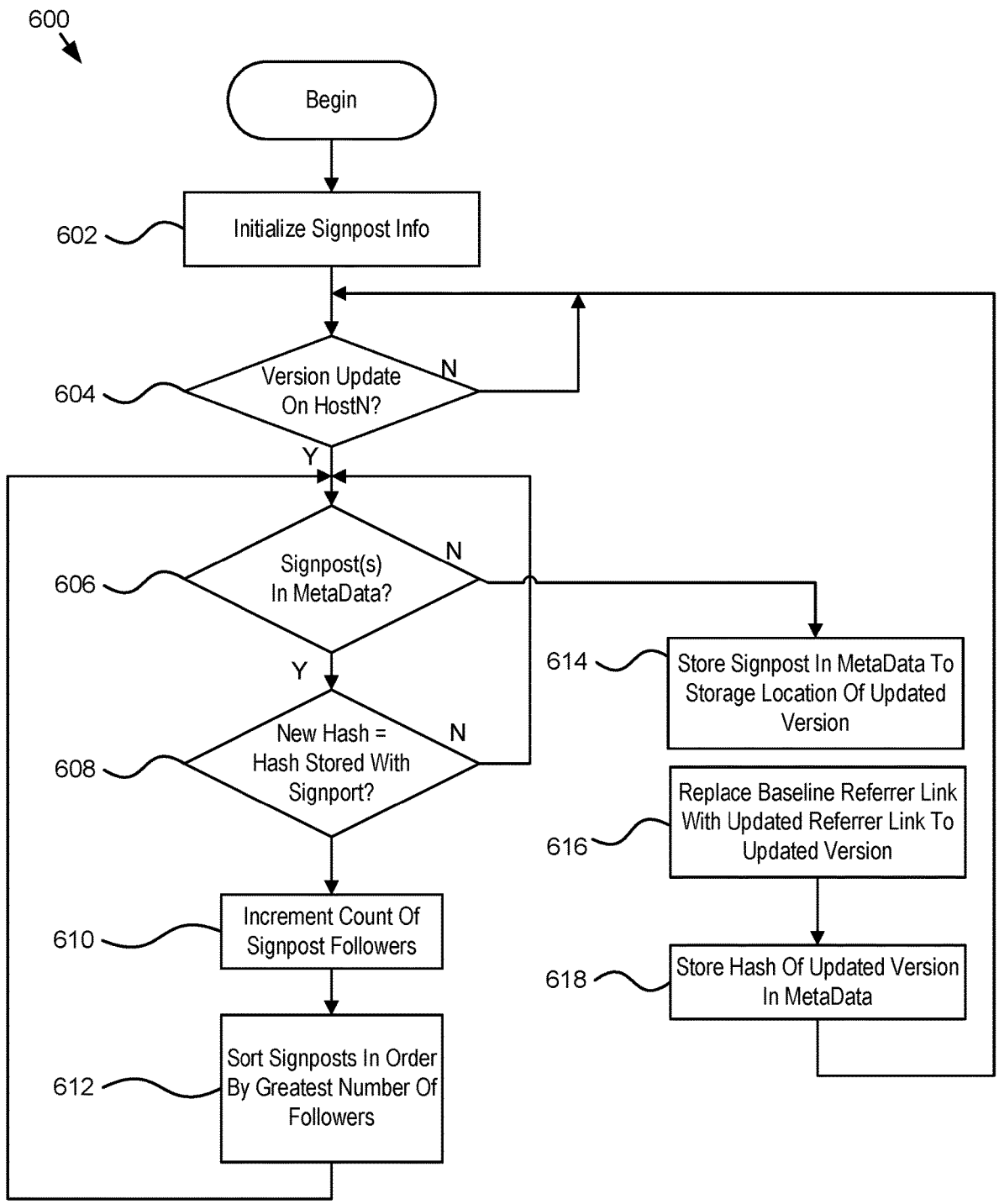
FIG. 6 is a schematic flow chart diagram illustrating another embodiment of a method for improved cohort management for version updates in data deduplication.

FIG. 6 is a schematic flow chart diagram illustrating another embodiment of a method 600 for improved cohort management for version updates in data deduplication. In one embodiment, the method 600 includes initializing 602 signpost information such as the list of signposts and the count of signpost followers. In some embodiments, the method 600 includes determining 604 whether a host is generating an updated data block for updating a baseline version of the data block. In other words, is the host updating the file, image, data block, etc. In response to determining that the host is updating a baseline version of a data block, the method 600 further determines 606 whether the metadata of the baseline version includes a signpost pointing to an updated referrer link in a second cohort of updated referrer links that points to a second location in the deduplicating storage device where an updated version data block is stored.

If the meta data does not include a signpost, the method 600 includes replacing 614 the baseline referrer link from the first cohort with the updated referrer link in response to determining that an additional updated version data block matches the updated version data block pointed to by the signpost. In various embodiments, the method 600 continues and includes storing 616 a signpost to a metadata section of the baseline version data block, where the signpost points to an updated referrer link in a second cohort of updated referrer links that points to a second location in the deduplicating storage device where an updated version data block is stored in response to the updated version data block being generated.

In certain embodiments, the method 600 stores 618 to the metadata section, a hash computed on the updated version data block pointed to by the signpost. If the metadata section includes a signpost, the method 600 determines 608 whether the additional updated version data block matches the updated version data block pointed to by the signpost by comparing an additional hash computed on the additional updated version data block with the hash stored with the signpost. In some embodiments, the method 600 continues and increments 610 a count of signpost followers in response to the cohort update module determining that the additional updated version data block matches the updated version data block pointed to by the signpost.

In various embodiments, the method 600 continues and sorts 612 the one or more signposts into a sorted order based on the count of signpost followers that have joined the second cohort corresponding to the updated version data block. In certain embodiments, the method 600 continues and compares 608 a hash of the additional updated version data block with the hashes stored with the one or more signposts in the sorted order. All or portions of the steps of the method 600 may be implemented using the baseline module 202, the signpost module 204, the cohort update module 206, and/or the compare module 402.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a baseline module that:
      stores a first baseline referrer link pointing from a first metadata section of a baseline version data block on a first storage volume to a first location in a deduplicating storage device where the baseline version data block is stored,
      stores a second baseline referrer link pointing from a second metadata section of the baseline version data block on one or more second storage volumes to the first metadata section of the baseline version data block, the first baseline referrer link and the second baseline referrer link comprising a first cohort of baseline referrer links, and
      stores a first updated referrer link pointing from a second metadata section of an updated version data block of the baseline version data block on a second storage volume of the one or more second storage volumes to a second location in the deduplicating storage device where the updated version data block is stored, in response to the updated version data block of the baseline version data block being generated;
   a signpost module that stores a signpost of the first metadata section of the baseline version data block, wherein the signpost points to the second metadata section of the updated version data block while maintaining the first baseline referrer link of the first storage volume that points to the first location on the deduplicating storage device and a second baseline referrer link of any remaining second storage volumes of the one or more second storage volumes that points to the first metadata section of the first storage volume; and
   a cohort update module that replaces the second baseline referrer link for any of the remaining second storage volumes with a second updated referrer link that points to the second metadata section of the updated version data block in response to determining that an additional updated version data block associated with any of the remaining second storage volumes matches the updated version data block stored at the second location on the deduplicating storage device and pointed to by the first updated referrer link,
   wherein at least a portion of each of said modules comprises one or more of a set of hardware circuits, a set of programmable hardware devices, and executable code stored on a set of non-transitory computer-readable storage media.

2. The apparatus of claim 1, wherein:
   the signpost module further stores, to the first metadata section, a hash computed on the updated version data block pointed to by the first updated referrer link; and
   the cohort update module determines whether the additional updated version data block matches the updated version data block pointed to by the first updated referrer link by comparing an additional hash computed on the additional updated version data block with the hash stored with the signpost.

3. The apparatus of claim 1, wherein the first updated referrer link and the second updated referrer link comprise a second cohort of updated referrer links distributed across a plurality of volumes.

4. The apparatus of claim 1, wherein the cohort update module replaces the second baseline referrer link with the second updated referrer link during inline deduplication of the additional updated version data block.

5. The apparatus of claim 1, wherein the signpost module increments a count of signpost followers in response to the cohort update module determining that the additional updated version data block matches the updated version data block pointed to by the first updated referrer link.

6. The apparatus of claim 5, wherein the signpost module stores one or more signposts and hashes to the first metadata section in response to one or more updated version data blocks of the baseline version data block being generated.

7. The apparatus of claim 6, wherein the signpost module sorts the one or more signposts into a sorted order based on the count of signpost followers that have joined a second cohort corresponding to the one or more updated version data blocks.

8. The apparatus of claim 7, wherein the cohort update module compares a hash of the additional updated version data block with the hashes stored with the one or more signposts in the sorted order.

9. A computer-implemented method, comprising:
   storing a first baseline referrer link pointing from a first metadata section of a baseline version data block on a first storage volume to a first location in a deduplicating storage device where the baseline version data block is stored;
   storing a second baseline referrer link pointing from a second metadata section of the baseline version data block on one or more second storage volumes to the first metadata section of the baseline version data block, the first baseline referrer link and the second baseline referrer link comprising a first cohort of baseline referrer links;

storing a first updated referrer link pointing from a second metadata section of an updated version data block of the baseline version data block on a second storage volume of the one or more second storage volumes to a second location in the deduplicating storage device where the updated version data block is stored, in response to the updated version data block of the baseline version data block being generated;

storing a signpost of the first metadata section of the baseline version data block, wherein the signpost points to the second metadata section of the updated version data block while maintaining the first baseline referrer link of the first storage volume that points to the first location on the deduplicating storage device and a second baseline referrer link of any remaining second storage volumes of the one or more second storage volumes that points to the first metadata section of the first storage volume; and replacing the second baseline referrer link for any of the remaining second storage volumes with a second updated referrer link that points to the second metadata second of the updated version data block in response to determining that an additional updated version data block associated with any of the remaining second storage volumes matches the updated version data block stored at the second location on the deduplicating storage device and pointed to by the first updated referrer link.

10. The method of claim 9, further comprising:
storing, to the first metadata section, a hash computed on the updated version data block stored pointed to by the first updated referrer link; and
determining whether the additional updated version data block matches the updated version data block pointed to by the first updated referrer link by comparing an additional hash computed on the additional updated version data block with the hash stored with the signpost.

11. The method of claim 9, wherein the first updated referrer link and the second updated referrer link comprise a second cohort of updated referrer links distributed across a plurality of volumes.

12. The method of claim 9, further comprising replacing the second baseline referrer link with the second updated referrer link during inline deduplication of the additional updated version data block pointed to by the signpost.

13. The method of claim 9, further comprising incrementing a count of signpost followers in response to determining that the additional updated version data block matches the updated version data block pointed to by the first updated referrer link.

14. The method of claim 13, further comprising storing one or more signposts and hashes to the first metadata section in response to one or more updated version data blocks of the baseline version data block being generated.

15. The method of claim 14, further comprising sorting the one or more signposts into a sorted order based on the count of signpost followers that have joined a second cohort corresponding to the updated version data blocks.

16. The method of claim 15, further comprising comparing a hash of the additional updated version data block with the hashes stored with the one or more signposts in the sorted order.

17. A system, comprising:
one or more storage devices; and
a storage controller configured to store deduplicated data to the one or more storage devices,
the storage controller comprising a processor that is configured to:
store a first baseline referrer link pointing from a first metadata section of a baseline version data block on a first storage volume to a first location in a deduplicating storage device where the baseline version data block is stored,
store a second baseline referrer link pointing from a second metadata section of the baseline version data block on one or more second storage volumes to the first metadata section of the baseline version data block, the first baseline referrer link and the second baseline referrer link comprising a first cohort of baseline referrer links,
store a first updated referrer link pointing from a second metadata section of an updated version data block of the baseline version data block on a second storage volume of the one or more second storage volumes to a second location in the deduplicating storage device where the updated version data block is stored, in response to the updated version data block of the baseline version data block being generated,
store a signpost of the first metadata section of the baseline version data block, wherein the signpost points to the second metadata section of the updated version data block while maintaining the first baseline referrer link of the first storage volume that points to the first location on the deduplicating storage device and a second baseline referrer link of any remaining second storage volumes of the one or more storage volumes that points to the first metadata section of the first storage volume, and
replace the second baseline referrer link for any of the remaining second storage volumes with a second updated referrer link that points to the second metadata section of the updated version data block in response to determining that an additional updated version data block associated with any of the remaining second storage volumes matches the updated version data block stored at the second location on the deduplicating storage device and pointed to by the first updated referrer link.

18. The system of claim 17, wherein the processor is further configured to perform:
storing, to the first metadata section, a hash computed on the updated version data block pointed to by the first updated referrer link; and
determining whether the additional updated version data block matches the updated version data block pointed to by the first updated referrer link by comparing an additional hash computed on the additional updated version data block with the hash stored with the signpost.

19. The system of claim 17, wherein the first updated referrer link and the second updated referrer link comprise a second cohort of updated referrer links distributed across a plurality of volumes.

20. The system of claim 17, wherein the processor is further configured to perform replacing the second baseline referrer link with the second updated referrer link during inline deduplication of the additional updated version data block.

* * * * *